(12) United States Patent
Sun et al.

(10) Patent No.: US 10,964,040 B2
(45) Date of Patent: Mar. 30, 2021

(54) DEPTH DATA PROCESSING SYSTEM CAPABLE OF PERFORMING IMAGE REGISTRATION ON DEPTH MAPS TO OPTIMIZE DEPTH DATA

(71) Applicant: ArcSoft Corporation Limited, Hangzhou (CN)

(72) Inventors: Hao Sun, Hangzhou (CN); Jian-Hua Lin, Hangzhou (CN); Chung-Yang Lin, Hangzhou (CN)

(73) Assignee: ArcSoft Corporation Limited, Zhejiang (CN)

( * ) Notice: Subject to any disclaimer, the term of this patent is extended or adjusted under 35 U.S.C. 154(b) by 68 days.

(21) Appl. No.: 16/224,815

(22) Filed: Dec. 19, 2018

(65) Prior Publication Data

US 2020/0090358 A1 Mar. 19, 2020

(30) Foreign Application Priority Data

Sep. 13, 2018 (CN) .......................... 201811067113.8

(51) Int. Cl.
*G06K 9/00* (2006.01)
*G06T 7/55* (2017.01)
(Continued)

(52) U.S. Cl.
CPC .............. *G06T 7/55* (2017.01); *G06T 3/0068* (2013.01); *G06T 7/337* (2017.01); *G06T 7/97* (2017.01); *G06T 2207/10028* (2013.01)

(58) Field of Classification Search
CPC . G06T 2207/10028; G06T 2207/10012; G06T 7/55; G06T 7/593;
(Continued)

(56) References Cited

U.S. PATENT DOCUMENTS 8,577,089 B2 * 11/2013 Choi .................... G06T 7/55
382/106
9,685,065 B2 * 6/2017 Diels .................... G08B 21/043
(Continued)

FOREIGN PATENT DOCUMENTS

JP 2000-350239 A 12/2000
JP 2013-40848 A 2/2013
(Continued)

OTHER PUBLICATIONS

Kuhnert, Klaus-Dieter, and Martin Stommel. "Fusion of stereo-camera and pmd-camera data for real-time suited precise 3d environment reconstruction." 2006 IEEE/RSJ International Conference on Intelligent Robots and Systems. IEEE, 2006. (Year: 2006).*
(Continued)

*Primary Examiner* — Li Liu
(74) *Attorney, Agent, or Firm* — Winston Hsu

(57) ABSTRACT

An operating method includes generating a first depth map by at least a first depth capture device, generating a second depth map by at least a second depth capture device, performing image registration on the first depth map with the second depth map to obtain transformed coordinates in the second depth map corresponding to pixels in the first depth map, and aligning depth data of the first depth map and depth data of the second depth map to generate an optimized depth map according to the transformed coordinates in the second depth map corresponding to the pixels in the first depth map.

9 Claims, 10 Drawing Sheets

(51) Int. Cl.
*G06T 3/00* (2006.01)
*G06T 7/00* (2017.01)
*G06T 7/33* (2017.01)

(58) Field of Classification Search
CPC ........ G06T 2207/20221; H04N 13/271; H04N 13/243; H04N 2013/0081
See application file for complete search history.

(56) References Cited

U.S. PATENT DOCUMENTS

| | | | |
|---|---|---|---|
| 2002/0015048 A1* | 2/2002 | Nister | G06T 7/55 |
| | | | 345/625 |
| 2010/0054541 A1* | 3/2010 | Chen | G08G 1/166 |
| | | | 382/107 |
| 2013/0141546 A1* | 6/2013 | Asatani | G06T 7/73 |
| | | | 348/48 |
| 2014/0064607 A1* | 3/2014 | Grossmann | G06T 3/0093 |
| | | | 382/154 |
| 2016/0005179 A1* | 1/2016 | Petyushko | G06T 5/50 |
| | | | 382/154 |
| 2016/0261844 A1* | 9/2016 | Kadambi | G01B 11/24 |
| 2017/0302910 A1* | 10/2017 | Richards | H04N 13/271 |
| 2020/0128225 A1* | 4/2020 | Ge | G06T 7/521 |

FOREIGN PATENT DOCUMENTS

| | | |
|---|---|---|
| JP | 2014-13146 A | 1/2014 |
| JP | 2016-85602 A | 5/2016 |
| KR | 10-0513055 B1 | 9/2005 |
| KR | 10-2006-0063558 A | 6/2006 |
| KR | 10-2014-0037425 A | 3/2014 |

OTHER PUBLICATIONS

Nair, Rahul, et al. "A survey on time-of-flight stereo fusion." Time-of-Flight and Depth Imaging. Sensors, Algorithms, and Applications. Springer, Berlin, Heidelberg, 2013. 105-127. (Year: 2013).*

Guðmundsson, Sigurjón Árni, Henrik Aanaes, and Rasmus Larsen. "Fusion of stereo vision and time-of-flight imaging for improved 3d estimation." International Journal on Intelligent Systems Technologies and Applications (IJISTA) 5.3/4 (2008): 425-433. (Year: 2008).*

Zhu, Jiejie, et al. "Reliability fusion of time-of-flight depth and stereo geometry for high quality depth maps." IEEE transactions on pattern analysis and machine intelligence 33.7 (2010): 1400-1414. (Year: 2010).*

Van Baar, Jeroen, et al. "Sensor fusion for depth estimation, including tof and thermal sensors." 2012 Second International Conference on 3D Imaging, Modeling, Processing, Visualization & Transmission. IEEE, 2012. (Year: 2012).*

* cited by examiner

DEPTH DATA PROCESSING SYSTEM CAPABLE OF PERFORMING IMAGE REGISTRATION ON DEPTH MAPS TO OPTIMIZE DEPTH DATA

BACKGROUND OF THE INVENTION

1. Field of the Invention

The present invention relates to a depth data processing system, and more particularly to a depth data processing system capable of performing image registration on depth maps to optimize depth data.

2. Description of the Prior Art

Due to the advancement of the electronic devices and the development of multimedia technology, more and more applications have now provided users with rich visual effects through three-dimensional display technology. It integrates the real and the virtual world to provide users with novel experiences. In order to capture the real-world appearance through the electronic device, in the prior art, in addition to obtaining image data through cameras, depth sensors are often applied to detect the distance of objects. After obtaining the distance data of the object, the electronic device can further perform motion recognition, for calculating the image with different focal lengths, or for generating a corresponding image frame in virtual reality.

However in the prior art, since a single depth sensor can capture a limited range of object depth and the depth sensor may be limited by the hardware, it may have greater range of error in a region where the texture is repeated or where light is mostly absorbed. So, it may be unable to determine a valid depth value. In addition, a single depth data does not have a baseline, so it is not easy to verify the accuracy of the depth values obtained, which may cause errors in the subsequent applications.

SUMMARY OF THE INVENTION

An embodiment discloses an operating method for a depth data processing system. The depth data processing system comprises a first depth capture device, a second depth capture device and a depth processing unit. The method comprises generating a first depth map by at least the first depth capture device; generating a second depth map by at least the second depth capture device; the depth processing unit performing image registration on the first depth map with the second depth map to obtain transformed coordinates in the second depth map corresponding to pixels in the first depth map; and the depth processing unit aligning depth data of the first depth map and depth data of the second depth map to generate an optimized depth map according to the transformed coordinates in the second depth map corresponding to the pixels in the first depth map.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows a section of a diagram of the first depth map according to an embodiment.

FIG. 4 shows a section of a diagram of the second depth map according to an embodiment.

DETAILED DESCRIPTION

Figure 1:
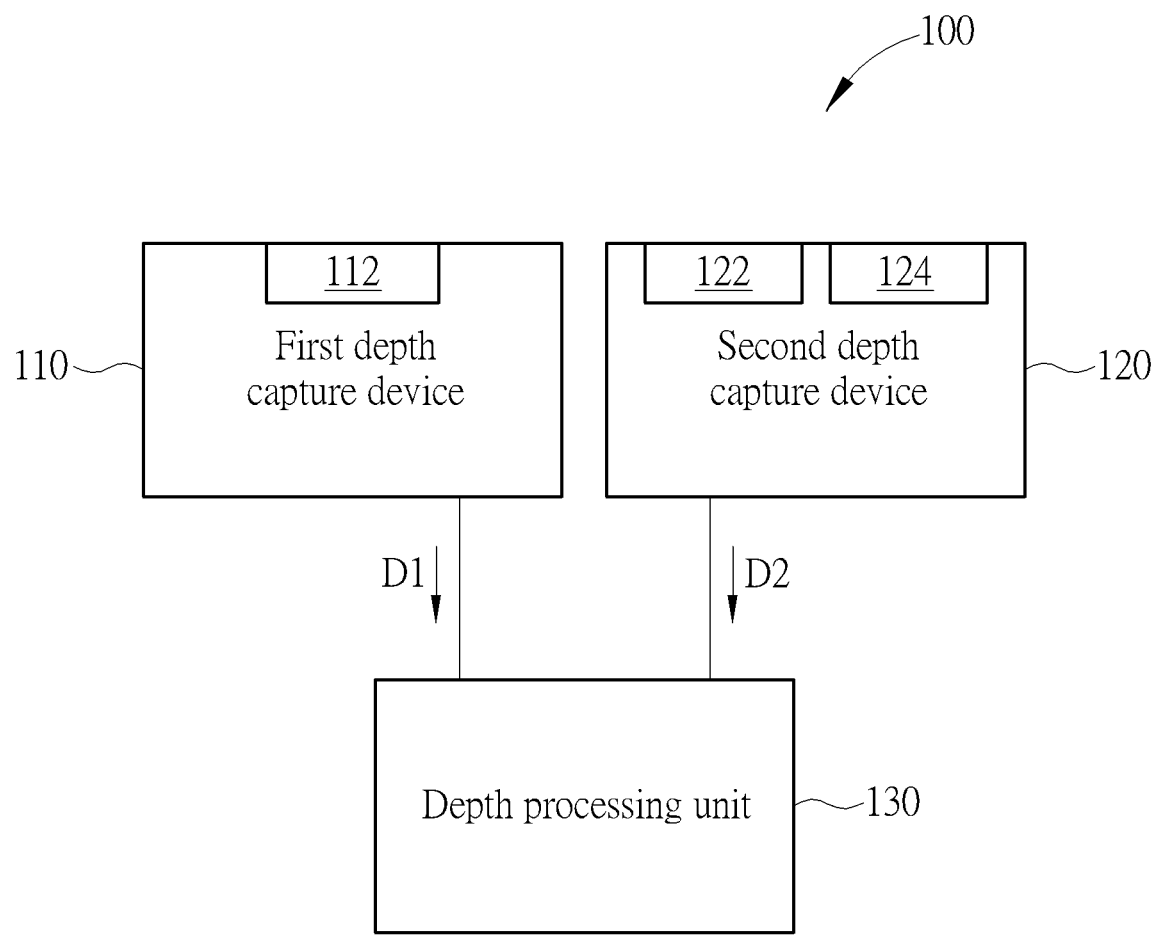
FIG. 1 is a diagram of a depth data processing system according to an embodiment of the present invention.

FIG. 1 is a diagram of a depth data processing system 100 according to an embodiment of the present invention. The depth data processing system 100 comprises a first depth capture device 110, a second depth capture device 120, and a depth processing unit 130.

The depth data processing system 100 may generate a first depth map D1 through the first depth capture device 110 and a second depth map D2 through the second depth capture device 120. In the embodiment in FIG. 1, the first depth capture device 110 may generate the first depth map D1 by an internal depth sensor 112, which may be a time-of-flight (TOF) sensor or a structured light sensor. The first depth capture device 110 can directly analyze the result sensed by the depth sensor 112 and generate a first depth map D1.

Figure 2:
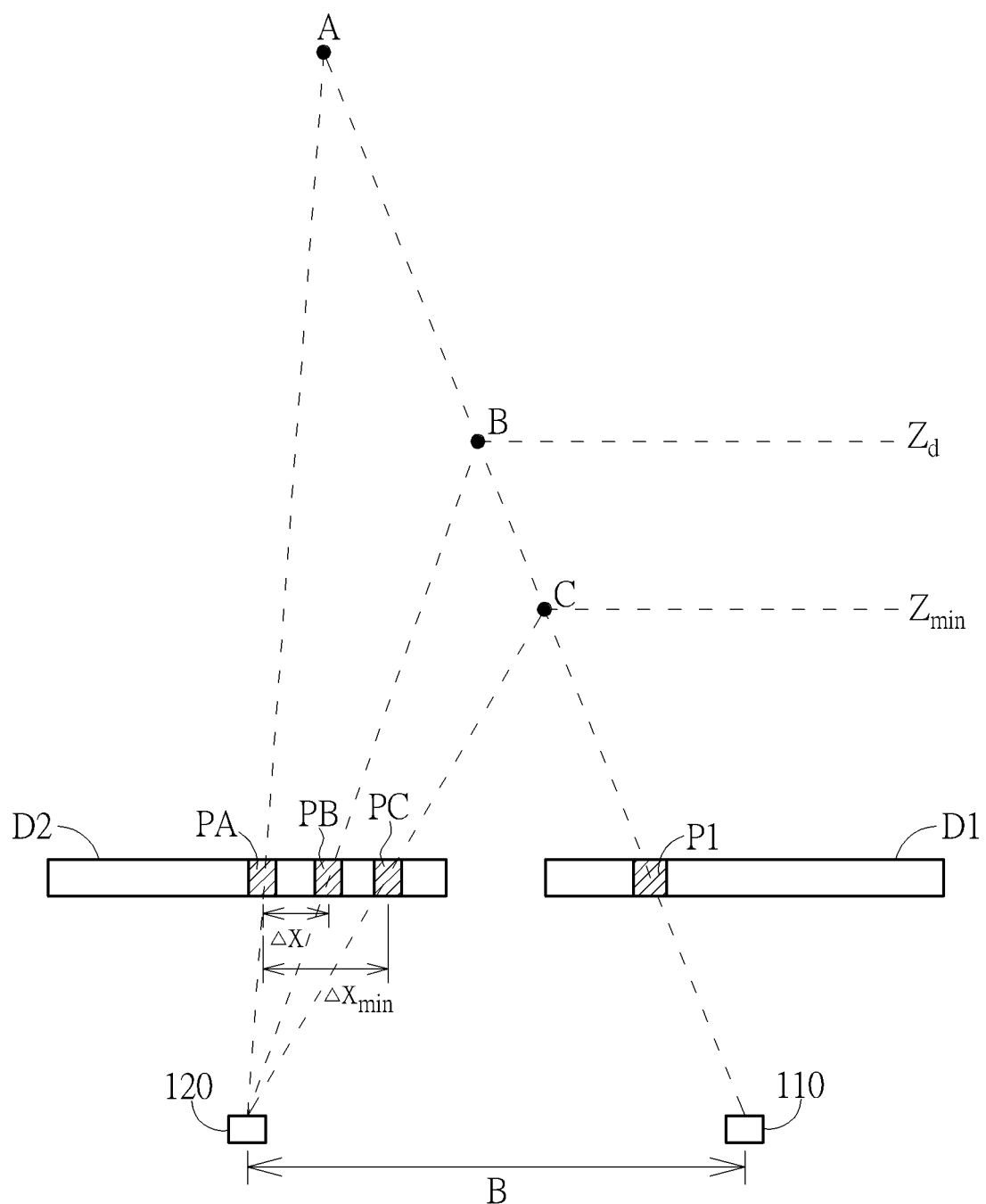
FIG. 2 shows a correlation diagram of a first depth map and a second depth map according to an embodiment.

In addition, the second depth capture device 120 may include common visible light cameras 122 and 124 and transmit the images captured by the cameras to the depth processing unit 130. The depth processing unit 130 may designate the captured image as a left eye image and a right eye image and apply a binocular vision algorithm to generate a second depth map D2 as shown in FIG. 2. However, the present invention does not limit the second depth capture device 120 to only include two cameras 122 and 124 or to only apply a binocular vision algorithm to generate the second depth map D2. In other embodiments, the second depth capture device 120 may also generate the second depth map D2 by an image captured through a single camera and by using other correlation algorithms.

In other words, in the embodiment of FIG. 1, the first depth capture device 110 may include a hardware specifically designed to generate depth data, and the second depth capture device 120 may include a visible light camera originally used to capture images. Therefore, it requires further calculation process by the depth processing unit 130 after capturing the image, so that the second depth map D2 required by the depth data processing system 100 can be generated. In this way, in addition to the first depth capture device 110, the deep data processing system 100 can use the camera provided on an existing electronic device to generate additional depth data for depth data optimization so as to reduce additional hardware components.

Figure 5:
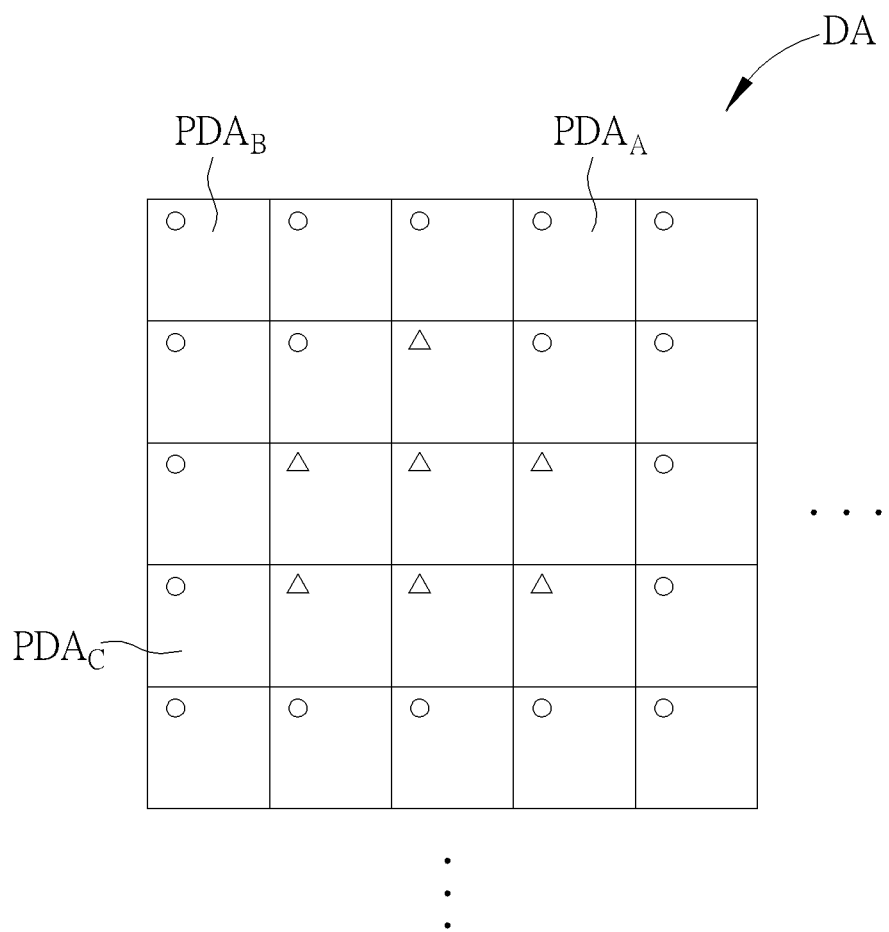
FIG. 5 shows an optimized depth map generated according to the first depth map and the second depth map.

After the first depth map D1 and the second depth map D2 are generated, the depth processing unit 130 may perform image registration on the first depth map D1 and the second depth map D2 to obtain transformed coordinates in the second depth map D2 corresponding to the pixels in the first depth map D1. It then can align the depth data of the first depth map D1 and the depth data of the second depth map D2 to generate an optimized depth map DA as shown in FIG. 5 according to the transformed coordinates.

In some embodiments, the depth processing unit 130 can transform coordinates of pixels in the first depth map D1 to coordinates in a first three-dimensional coordinate system of the first depth capture device 110 to generate first three-dimensional coordinates of the pixels in the first depth map D1 according to internal parameters of the first depth capture device 110. Then, the depth processing unit 130 can transform the first three-dimensional coordinates of the pixels in the first depth map D1 to second three-dimensional coordinates in a second three-dimensional coordinate system of the second depth capture device 120 according to external parameters of the first depth capture device 110 and the second depth capture device 120. Finally, the depth processing unit 130 can transform the second three-dimensional coordinates of the pixels in the first depth map D1 to the transformed coordinates in the second depth map D2 corresponding to the pixels in the first depth map D1 according to internal parameters of the second depth capture device 120.

FIG. 2 is a correlation diagram of the first depth map D1 and the second depth map D2 in an embodiment. In FIG. 2, taking a pixel P1 in the first depth map D1 as an example, when the depth value of the pixel P1 is approaching infinity, the pixel P1 may correspond to a point A in the three-dimensional space. The point A in the second depth map D2 will fall at the position of the pixel PA. When the depth value of the pixel P1 is $Z_d$, the pixel P1 would correspond to a point B in the three-dimensional space, and the point B will fall at the position of a pixel PB in the second depth map D2. Moreover, when the depth of the pixel P1 is the minimum effective depth value $Z_{min}$ that the first depth capture device 110 can obtain, the pixel P1 may correspond to a point C in the three-dimensional space, and the point C in the second depth map D2 will fall at the position of a pixel PC.

In other words the pixel P1 in the first depth map D1 may correspond to different positions in the second depth map D2 because of the difference of its depth in the three-dimensional space. In some embodiments, the distance $\Delta x$ between the pixel PB corresponding to the pixel P1 in the second depth map D2 and the pixel PA in the second depth map D2 may be expressed by Equation 1.

$$\Delta x = \frac{B \cdot f2}{Z} \quad \text{Equation 1}$$

In Equation 1, the parameter B represents the baseline distance between the camera corresponding to the first depth map D1 and the camera corresponding to the second depth map D2. The parameter f2 represents the focal length of the second depth capture device 120, and the parameter Z is the depth value of the pixel P1 in the second depth map D2. According to Equation 1 and FIG. 2, when the depth value Z is approaching infinity, the pixel P1 would correspond to the position of the pixel PA in the second depth map D2, thus the distance $\Delta x$ would be approaching zero. When the depth value Z is the minimum effective depth $Z_{min}$, the pixel P1 would correspond to the position of the pixel PC in the second depth map D2, and the distance $\Delta x$ would be equal to the distance $\Delta x_{min}$ shown in FIG. 2.

In this case, if the coordinates of the pixel PA in the second depth map D2 can be expressed as $(x_{max}, y_{max})$, and the coordinates of the pixel PC in the second depth map D2 can be expressed as $(x_{min}, y_{min})$, then the coordinates of the pixel PB in the second depth map D2 can be expressed as $(x_d, y_d)$. The coordinates can be derived from Equations 2 and 3.

$$x_d = \frac{(Z_{min} - Z_d)(x_{min} - x_{max})}{Z_d} + x_{min} \quad \text{Equation 2}$$

$$y_d = \frac{(Z_{min} - Z_d)(y_{min} - y_{max})}{Z_d} + y_{min} \quad \text{Equation 3}$$

In this way, the depth processing unit 130 can obtain the transformed coordinates in the second depth map corresponding to the pixels in the first depth map D1. In some embodiments, the depth processing unit 130 may use a lookup table to reduce calculation complexity. After obtaining the transformed coordinates, the depth processing unit 130 may align the depth data of the first depth map D1 and the depth data of the second depth map D2 to generate an optimized depth map according to the transformed coordinates.

Figure 3:
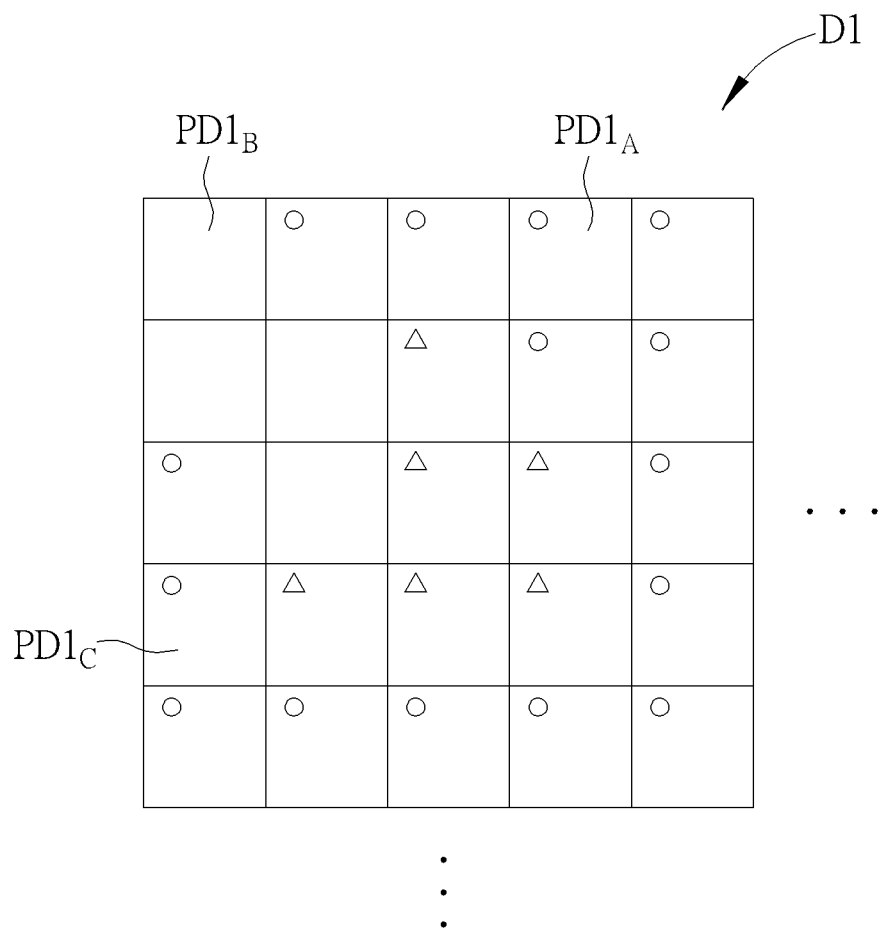
Figure 4:
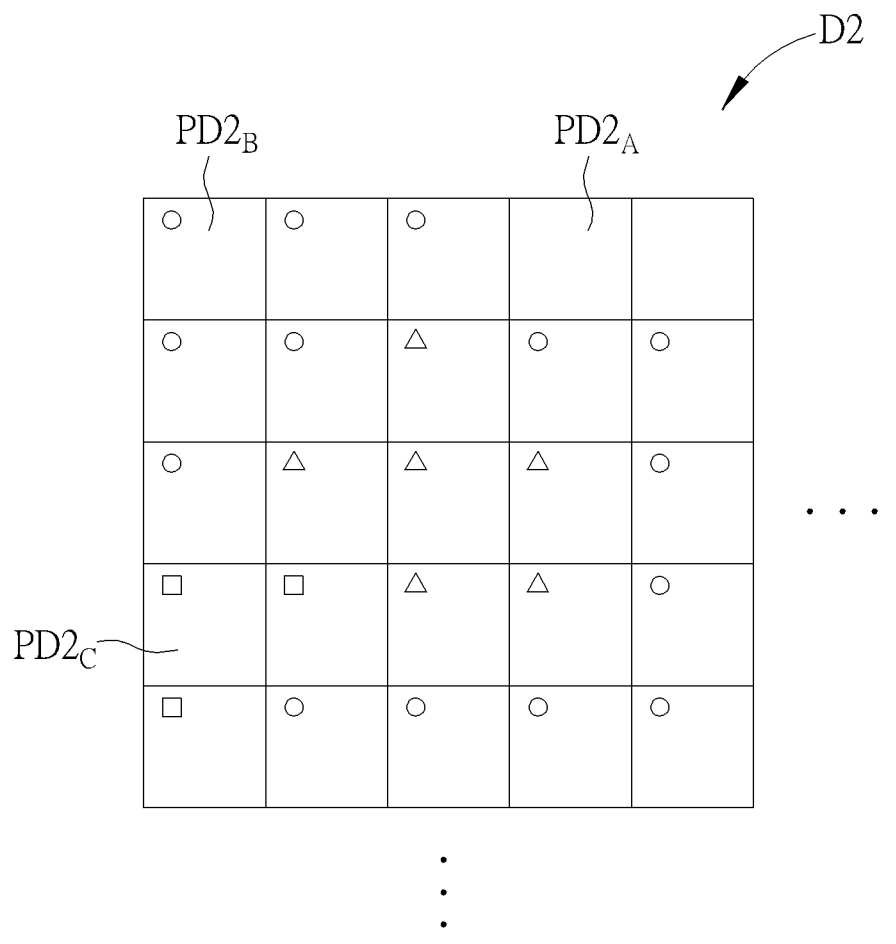

FIG. 3 shows a section of the diagram of the first depth map D1 according to an embodiment. FIG. 4 shows a section of the diagram of the second depth map D2 according to an embodiment. Since the first depth map D1 and the second depth map D2 are generated by the first depth capture device 110 and the second depth capture device 120 respectively, the two depth maps may be slightly different, and can complement each other to generate an optimized depth map DA. FIG. 5 shows the optimized depth map DA generated according to the first depth map D1 and the second depth map D2.

In addition, in FIG. 3 to FIG. 5, a triangle in the pixel indicates that the pixel belongs to the foreground in the depth map. A circle in the pixel indicates that the pixel belongs to the background in the depth map. A square in the pixel indicates that the pixel has an unreasonable depth value (calculation error). If there is no mark on the pixel, it means that the pixel has not been given a value.

Suppose a pixel $PD1_A$ in the first depth map D1 corresponds to a pixel $PD2_A$ in the second depth map D2, and the pixel $PD2_A$ has not been given a depth value, then the depth processing unit 130 would render a depth value to the corresponding pixel $PDA_A$ in the optimized depth map DA according to the depth value of the pixel $PD1_A$. In this way, the pixel $PDA_A$ corresponding to the pixel $PD1_A$ and the pixel $PD2_A$ in the optimized depth map DA would be rendered a depth value according to the depth value of the pixel $PD1_A$ and be marked as a circle.

Similarly, suppose a pixel $PD1_B$ in the first depth map D1 corresponds to a pixel $PD2_B$ in the second depth map D2, and the pixel $PD1_B$ has not been given a depth value, then the depth processing unit 130 would render a depth value to the corresponding pixel $PDA_B$ in the optimized depth map DA according to the depth value of the pixel $PD2_B$. In this way, the pixel $PDA_B$ corresponding to the pixel $PD1_B$ and the pixel $PD2_B$ in the optimized depth map DA would be rendered a depth value according to the depth value of the pixel $PD2_B$ and be marked as a circle.

Further, suppose a pixel $PD1_C$ in the first depth map D1 corresponds to a pixel $PD2_C$ in the second depth map D2, and the pixel $PD2_C$ has been given an unreasonable depth value, then the depth processing unit 130 would render a depth value to the corresponding pixel $PDA_C$ in the optimized depth map DA according to the depth value of the pixel $PD1_C$. In this way, in the optimized depth map DA, the pixel $PDA_C$ corresponding to the pixel $PD1_C$ and the pixel $PD2_C$ would be rendered a depth value according to the depth value of the pixel $PD1_C$ and be marked as a circle.

In some embodiments, since the first depth capture device 110 is a hardware specifically for obtaining depth data to generate the first depth map D1, the confidence of the first depth map D1 is likely to be higher than the confidence of the second depth map D2. In this case, the optimized depth map DA may be based on the first depth map D1 and be complemented by the second depth map D2. In the case where the depth values have been given to both the first depth map D1 and the second depth map D2, the depth processing unit 130 may preferentially render values to the pixels in the depth map DA according to the depth data in the first depth map D1. However, in other embodiments, the depth processing unit 130 may also change to complement the first depth map D1 through the second depth map D2 to generate an optimized depth map DA according to the actual condition of the system or it may align the depth data of both by appropriate weights.

By the above-mentioned method, the depth processing unit 130 can make the first depth map D1 and the second depth map D2 complement each other, thereby reducing blank pixels and unreasonable depth values in the first depth map D1 and in the second depth map D2. It gives more valid pixels in the optimized depth map DA and allows the depth data processing system 100 to generate a more complete and accurate depth map.

In addition, the resolutions of the first depth map D1 and the second depth map D2 may be different. For example, when the resolution of the first depth map D1 is less than the resolution of the second depth map D2, each pixel in the first depth map D1 may correspond to a plurality of pixels in the second depth map D2. For example, FIG. 6 is a correlation diagram of a first depth map D1' and a second depth map D2' according to an embodiment.

Figure 6:
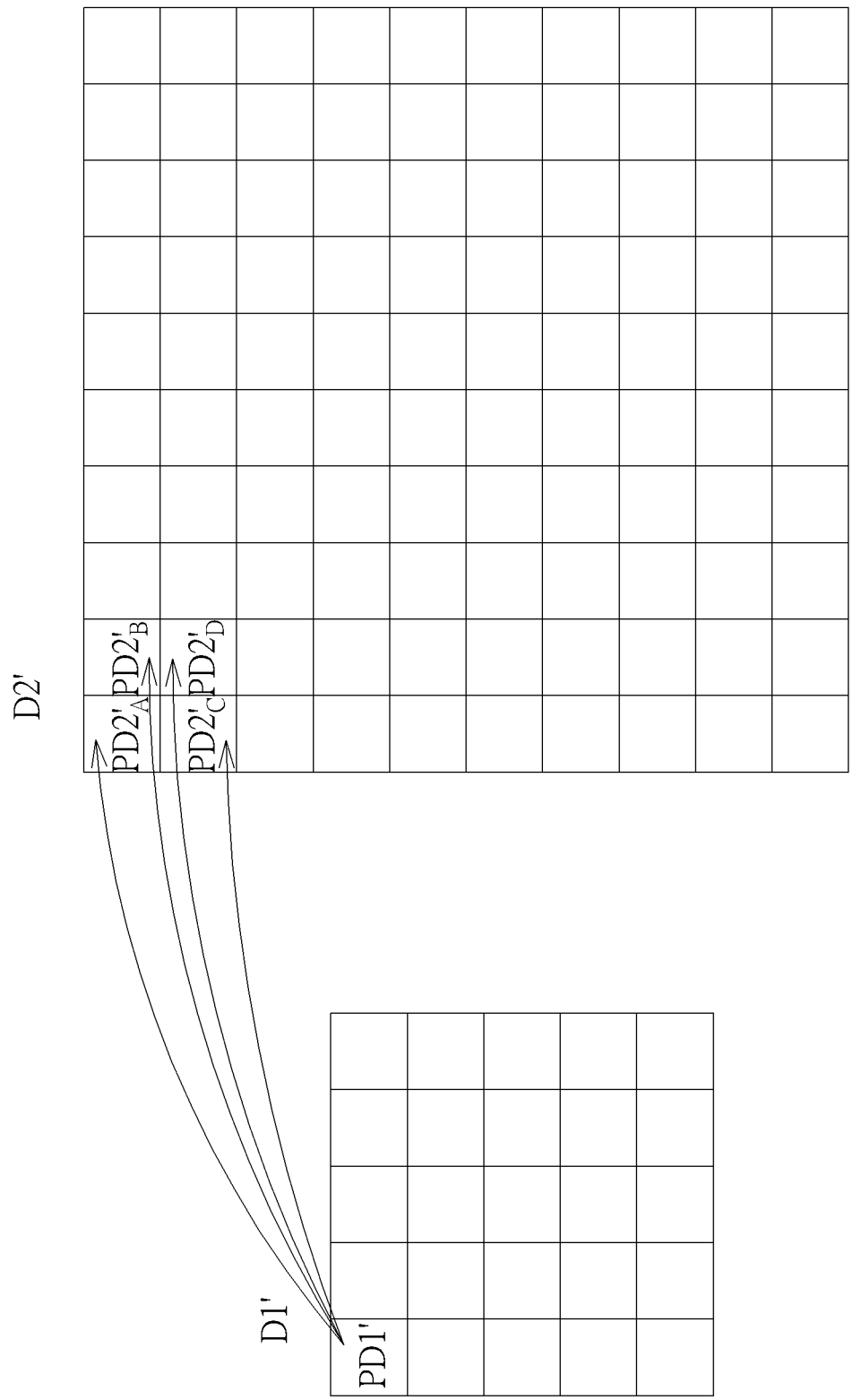
FIG. 6 shows a correlation diagram of a first depth map and a second depth map according to an embodiment.

In FIG. 6, a pixel PD1' in the first depth map D1' may substantially correspond to plurality of pixels $PD2'_A$, $PD2'_B$, $PD2'_C$ and $PD2'_D$ in the second depth map D2. In this case, the depth data processing system 100 would rendered values to corresponding pixels in the optimized depth map DA according to the depth value of the pixel PD1' in the first depth map D1' and the pixels $PD2'_A$, $PD2'_B$, $PD2'_C$ and $PD2'_D$ in the second depth map D2'. In other words, the depth data processing system 100 can adjust the correlation of the pixels between different depth maps according to the resolution of the first depth map D1' and the second depth map D2'.

Further, in the embodiment in FIG. 1, the first depth capture device 110 is a hardware specifically designed to obtain depth data to generate the first depth map D1, and the second depth capture device 120 is a visible light camera to capture the image. Then the second depth map D2 is generated by software processing. However, the present invention does not limit the first depth capture device 110 to be a hardware specifically designed to generate depth data.

Figure 7:
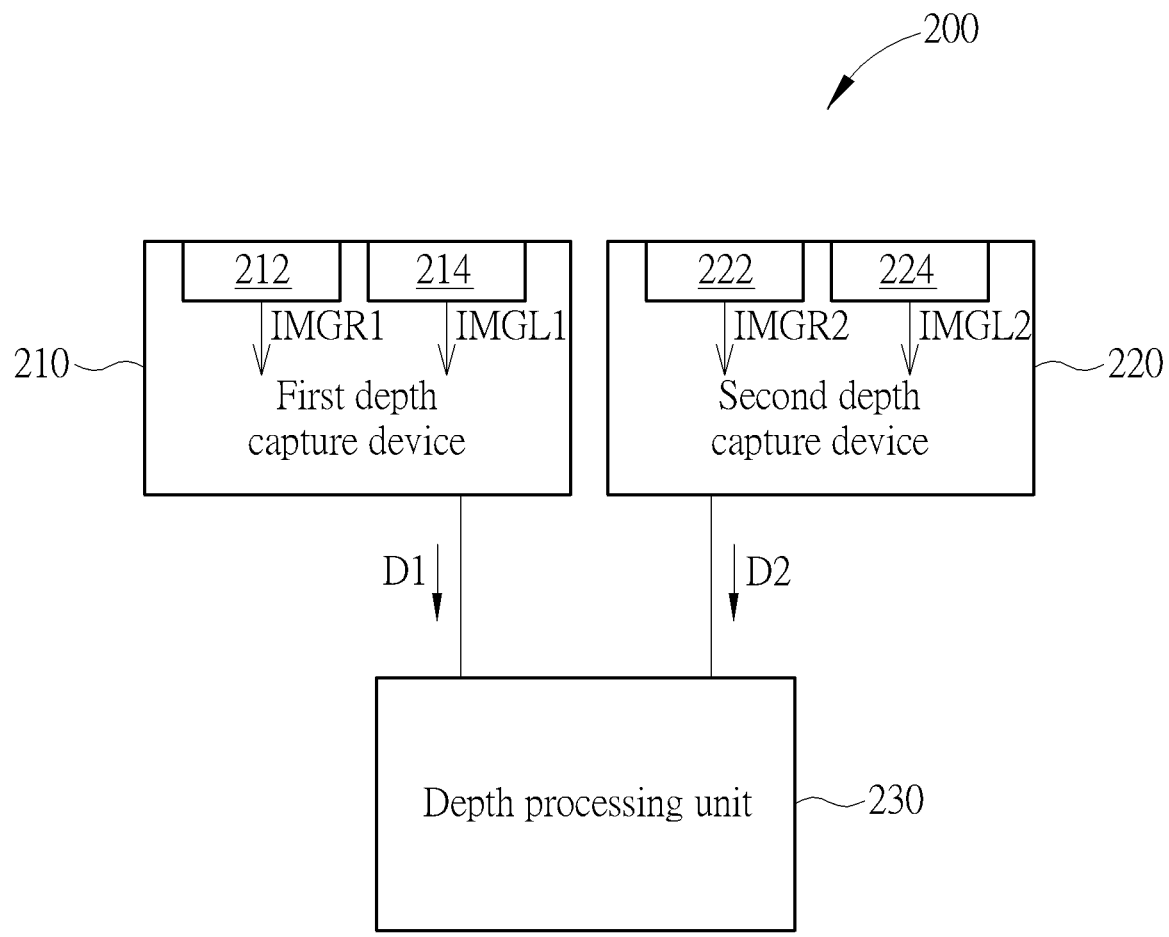
FIG. 7 is a diagram of a depth data processing system according to another embodiment.

FIG. 7 is a diagram of a depth data processing system 200 according to another embodiment. The depth data processing systems 100 and 200 have similar configurations and can operate according to similar principles. The depth data processing system 200 may include a first depth capture device 210, a second depth capture device 220, and a depth processing unit 230. Both the first depth capture device 210 and the second depth capture device 220 can capture images by using visible light cameras and generate a first depth map D1 and a second depth map D2 through the depth processing unit 230.

In other words, in FIG. 7, the first depth capture device 210 can capture the first images IMGR1 and IMGL1 by at least one camera, but not limited to two cameras 212 and 214. The depth processing unit 230 can generate the first depth map D1 according to the first images IMGR1 and IMGL1. Similarly, the second depth capture device 220 can capture the second images IMGR2 and IMGL2 by cameras 222 and 224 and the depth processing unit 230 can generate the second depth map D2 according to the second images IMGR2 and IMGL2.

Figure 8:
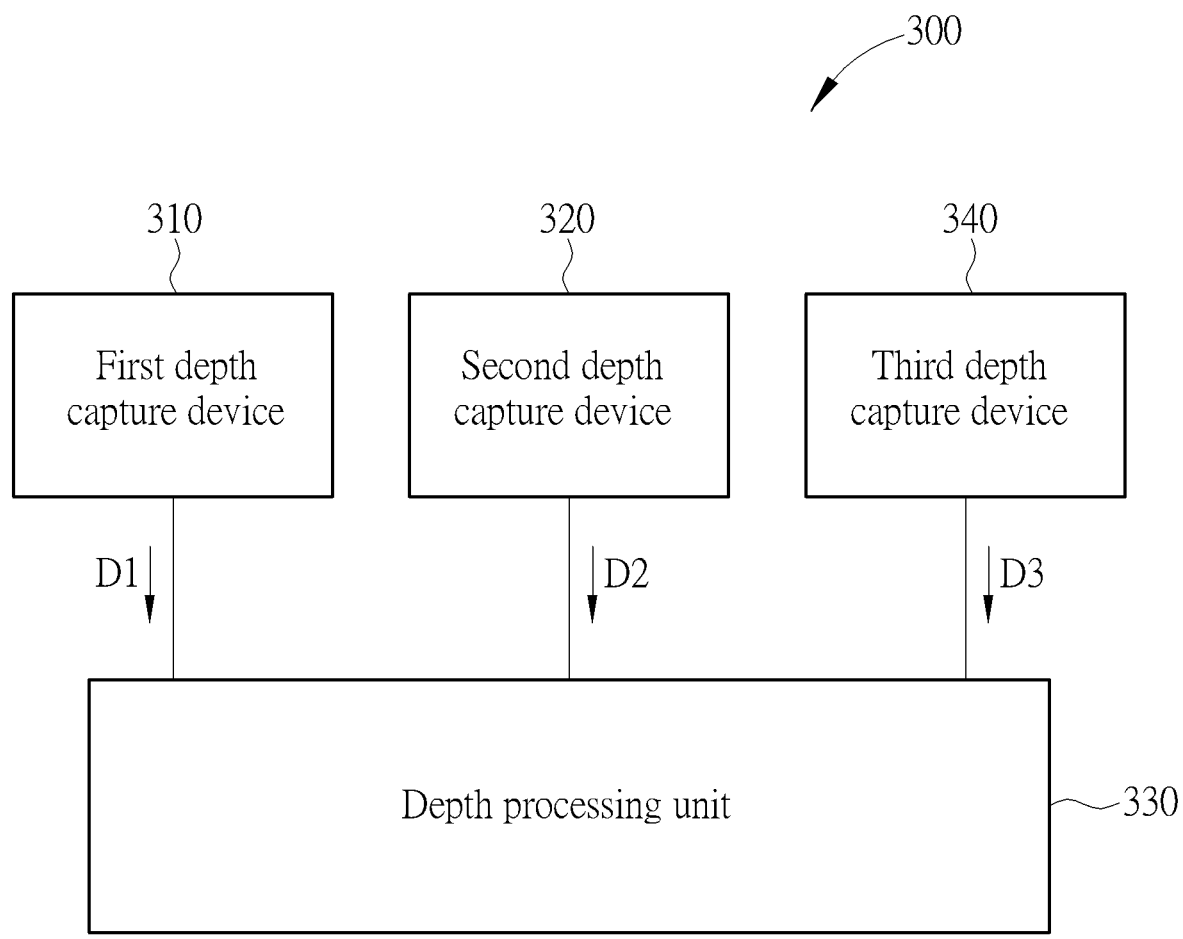
FIG. 8 is a diagram of a depth data processing system according to another embodiment.

In an embodiment of FIG. 8, a depth data processing system 300 may comprise two depth capture devices, but not limited thereto. In some embodiments, the depth data processing system may comprise more depth capture devices. FIG. 8 is a diagram of a depth data processing system 300 in according to another embodiment. The depth data processing systems 100 and 300 have similar configurations and can operate according to similar principles. However, the depth data processing system 300 can include a first depth capture device 310, a second depth capture device 320, a depth processing unit 330, and a third depth capture device 340. The first depth capture device 310, the second depth capture device 320, and the third depth capture device 340 may capture images by using visible light cameras and a first depth map D1, a second depth map D2 and a third depth map D3 may be generated by the depth processing unit 330. However, the invention is not limited thereto.

In addition, in the embodiment of FIG. 8, the depth processing unit 330 may generate an optimized depth map according to the depth data of the first depth map D1, the second depth map D2, and the third depth map D3. For example, the depth processing unit 330 can perform image registration on the first depth map D1 and the second depth map D2 to obtain transformed coordinates in the second depth map corresponding to pixels in the first depth map. Using the same method, it can perform image registration on the third depth map D3 and the second depth map D2 to obtain transformed coordinates in the second depth map D2 corresponding to the pixels in the third depth map D3. Then, the depth processing unit 330 aligns the depth data of the first depth map D1, the second depth map D2, and the third depth map D3 to generate an optimized depth map according to the transformed coordinates in the second depth map D2 corresponding to the pixels in the first depth map D1 and the third depth map D3.

Since the depth data processing systems 100 and 200 can perform image registration on different depth maps to compensate for defects in a single depth map, an optimized depth map can be generated. It not only makes the depth data more accurate, but also provides a wider range of depth data.

Figure 9:
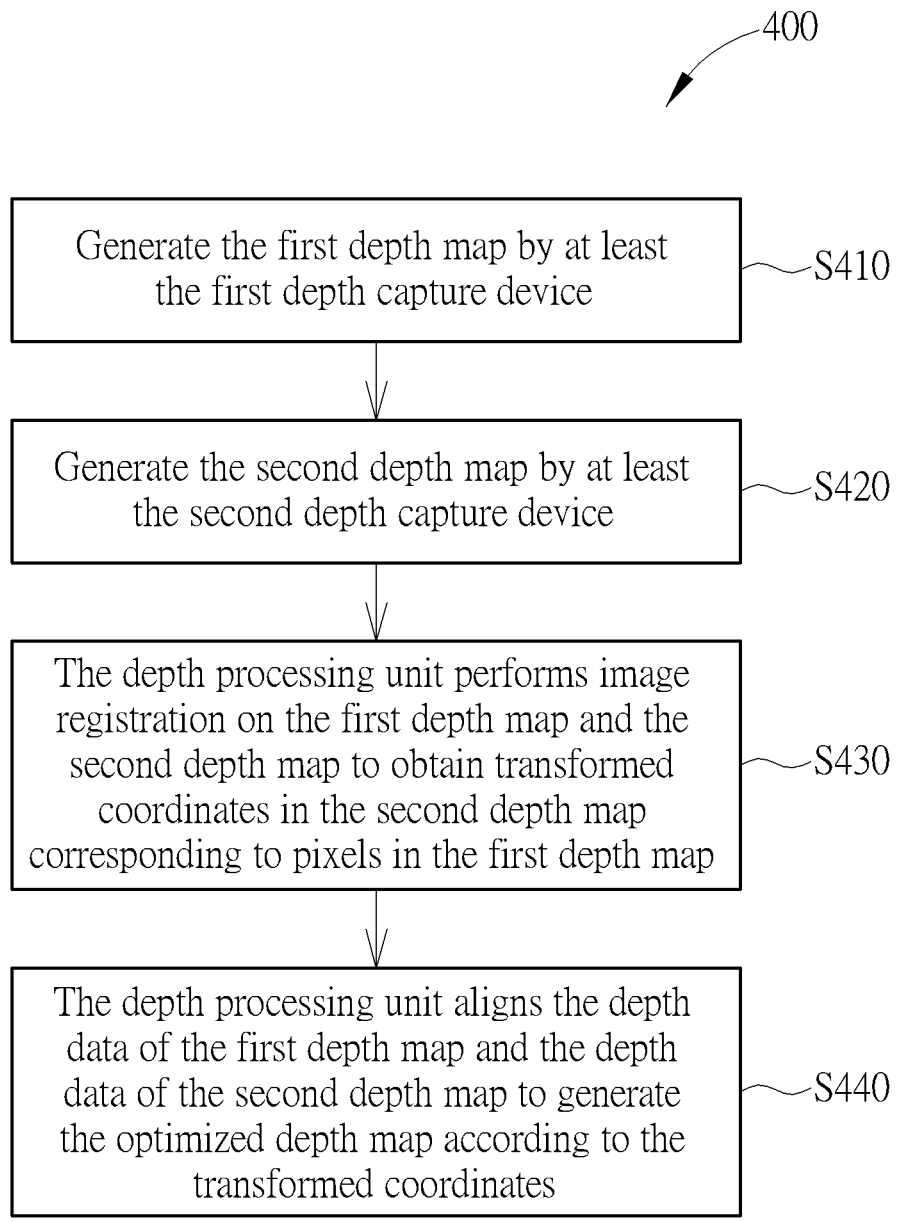
FIG. 9 is a flow chart of the operating method of the deep data processing system of FIG. 1 or FIG. 2.

FIG. 9 is a flow chart of a method 400 for operating a depth data processing system 100 (or 200) according to an embodiment of the present invention. The method 400 includes steps S410 to S440.

S410: Generate the first depth map D1 by at least the first depth capture device 110 (or 210);

S420: Generate the second depth map D2 by at least the second depth capture device 120 (or 220);

S430: The depth processing unit 130 (or 230) performs image registration on the first depth map D1 and the second depth map D2 to obtain transformed coordinates in the second depth map D2 corresponding to pixels in the first depth map D1;

S440: The depth processing unit 130 (or 230) aligns the depth data of the first depth map D1 and the depth data of the second depth map D2 to generate the optimized depth map DA according to the transformed coordinates.

Figure 10:
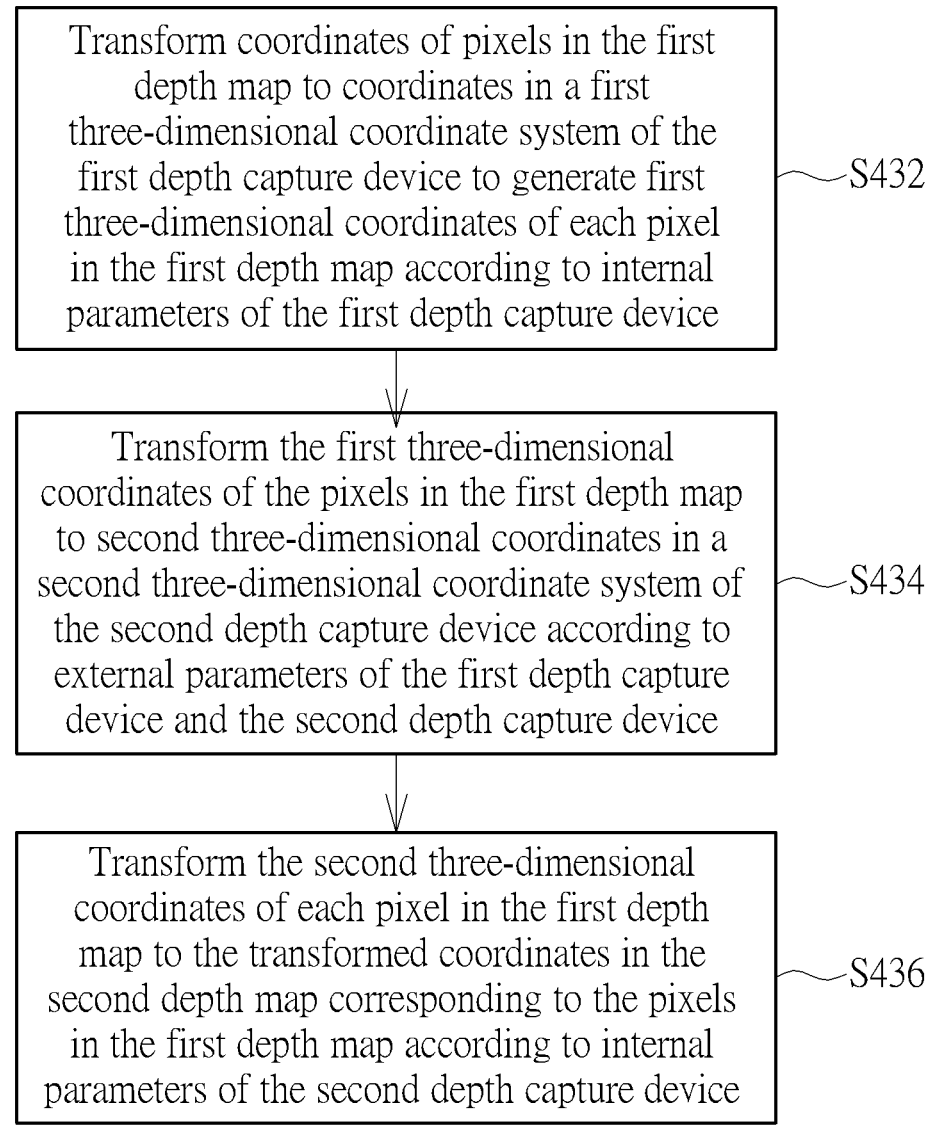
FIG. 10 is a flow chart of the sub-steps in step S430 of FIG. 9.

FIG. 10 is a flow chart of sub-steps S432 to S436 in the step S430.

S432: Transform coordinates of pixels in the first depth map D1 to coordinates in a first three-dimensional coordinate system of the first depth capture device 110 (or 210) to generate first three-dimensional coordinates of the pixels in the first depth map according to internal parameters of the first depth capture device 110 (or 210);

S434: Transform the first three-dimensional coordinates of the pixels in the first depth map D1 to second three-dimensional coordinates in a second three-dimensional coordinate system of the second depth capture device 120 (or 220) according to external parameters of the first depth capture device 110 (or 210) and the second depth capture device 120 (or 220);

S436: Transform the second three-dimensional coordinates of the pixels in the first depth map D1 to the transformed coordinates in the second depth map D2 corresponding to the pixels in the first depth map D1 according to internal parameters of the second depth capture device 120 (or 220).

Taking FIG. 2 as an example, the depth processing unit 130 may align the three-dimensional coordinates corresponding to the first depth map D1 and the second depth map D2 in steps S432 to S436, and then it may transform the second three-dimensional coordinates of the pixels in the depth map D1 to the transformed coordinates in the second depth map D2 corresponding to the pixels in the first depth map D1 according to Equations 2 and 3.

In addition, in step S440, when the resolution of the first depth map is less than the resolution of the second depth map, and the transformed coordinates in the second depth map corresponding to the first pixel in the first depth map correspond to a plurality of second pixels in the second depth map, depth values may be rendered to a plurality of third pixels corresponding to the plurality of second pixels in the optimized depth map according to the depth value of the first pixel and the depth values of the plurality of second pixels. Taking FIG. 6 as an example, the depth data processing system 100 renders depth values to the pixels in the optimized depth map corresponding to the pixels $PD2'_A$, $PD2'_B$, $PD2'_C$, and $PD2'_D$ according to the depth value of the pixel $PD1'$ in the first depth map $D1'$ and the depth values of the pixels $PD2'_A$, $PD2'_B$, $PD2'_C$, and $PD2'_D$ in the second depth map $D2'$. In other words, the depth data processing system 100 can adjust the correlation between pixels of different depth maps according to the resolution of the first depth map $D1'$ and the second depth map $D2'$.

Furthermore, in step S440, suppose the first pixel in the first depth map corresponds to the second pixel in the second depth map, and the second pixel has not been given a depth value, Then, the depth processing unit would render a depth value to the third pixel corresponding to the first pixel and the second pixel in the optimized depth map according to the depth value of the first pixel. In addition, suppose the first pixel in the first depth map corresponds to the second pixel in the second depth map, and the second pixel has been given an unreasonable depth value, the depth processing unit would render a depth value to the third pixel corresponding to the first pixel and the second pixel in the optimized depth map according to the depth value of the first pixel.

Taking FIG. 3 to FIG. 5 as an example, the pixel $PD1_B$ in the first depth map D1 corresponds to the pixel $PD2_B$ in the second depth map D2, and the pixel $PD1_B$ has not been given a depth value, the depth processing unit 130 in the sub-step S444 may render a depth value to the corresponding pixel $PDA_B$ in the optimized depth map DA according to the depth value of the pixel $PD2_B$.

By the method 400, the depth data processing systems 100 and 200 can perform image registration on different depth maps to compensate for defects in a single depth map so as to generate an optimized depth map. It not only makes the depth data more accurate, but also provides a wider range of depth data.

Further, the method 400 may also be applied to the depth data processing system 300. By the same manner in step S430, it can perform image registration on the second depth map D2 and the third depth map D3 to obtain the transformed coordinates in the second depth map D2 corresponding to each pixel in the third depth map D3. Then, the depth processing unit 330 aligns the depth data of the first depth map D1, the second depth map D2, and the third depth map D3 to generate an optimized depth map according to transformed coordinates in the second depth map D2 corresponding to the pixels in the first depth map D1 and the third depth map D3.

In summary, the depth data processing system and its operating methods provided by the embodiments of the present invention can complement the depth data in different depth maps, thereby generating an optimized depth map. It not only makes the depth data more accurate but also provides a wider range of depth data, which may be used more efficiently by various applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for operating a depth data processing system, the depth data processing system comprising a first depth capture device, a second depth capture device and a depth processing unit, the method comprising:
   generating a first depth map by at least the first depth capture device;
   generating a second depth map by at least the second depth capture device;
   the depth processing unit performing image registration on the first depth map and the second depth map to generate transformed coordinates in the second depth map corresponding to pixels in the first depth map; and
   the depth processing unit aligning depth data of the first depth map and depth data of the second depth map to generate an optimized depth map according to the transformed coordinates in the second depth map corresponding to the pixels in the first depth map;
   wherein:
      when coordinates in the second depth map corresponding to a first pixel in the first depth map correspond to a second pixel in the second depth map and the second pixel has not been given a depth value, the depth processing unit rendering a depth value to a third pixel corresponding to the first pixel and the second pixel in the optimized depth map according to a depth value of the first pixel; and
      the transformed coordinates in the second depth map corresponding to pixels in the first depth map are derived from equations:

$$x_d = \frac{(Z_{min} - Z_d)(x_{min} - x_{max})}{Z_d} + x_{min} \qquad \text{Equation 2}$$

$$y_d = \frac{(Z_{min} - Z_d)(y_{min} - y_{max})}{Z_d} + y_{min} \qquad \text{Equation 3}$$

$Z_{min}$ being the minimum effective depth value obtained by the first depth capture device of a pixel in the first depth map, $x_{min}$ and $y_{min}$ being the transformed coordinates of the pixel with the minimum effective depth value, $x_{max}$ and $y_{max}$ being the transformed coordinates of the pixel with a depth value approaching infinity, $Z_d$ being a depth value of the pixel in the first depth map obtained by the first depth capture device, $x_d$ and $y_d$ being the transformed coordinates of the pixel in the second depth map.

2. The method of claim 1, wherein the depth processing unit performing image registration on the first depth map and the second depth map to generate the transformed coordinates in the second depth map corresponding to the pixels in the first depth map comprises:
the depth processing unit transforming coordinates of the pixels in the first depth map to coordinates in a first three-dimensional coordinate system of the first depth capture device to generate first three-dimensional coordinates of the pixels in the first depth map according to internal parameters of the first depth capture device;
the depth processing unit transforming the first three-dimensional coordinates of the pixels in the first depth map to second three-dimensional coordinates in a second three-dimensional coordinate system of the second depth capture device according to external parameters of the first depth capture device and the second depth capture device; and
the depth processing unit transforming the second three-dimensional coordinates of the pixels in the first depth map to the transformed coordinates in the second depth map corresponding to the pixels in the first depth map according to internal parameters of the second depth capture device.

3. The method of claim 1, wherein the depth processing unit aligning the depth data of the first depth map and the depth data of the second depth map to generate the optimized depth map according to the transformed coordinates in the second depth map corresponding to the pixels in the first depth map comprises:
when coordinates in the second depth map corresponding to a first pixel in the first depth map correspond to a second pixel in the second depth map and the second pixel has been given an unreasonable depth value, the depth processing unit rendering a depth value to a third pixel corresponding to the first pixel and the second pixel in the optimized depth map according to a depth value of the first pixel.

4. The method of claim 1, wherein the depth processing unit aligning the depth data of the first depth map and the depth data of the second depth map to generate the optimized depth map according to the transformed coordinates in the second depth map corresponding to the pixels in the first depth map comprises:
when a resolution of the first depth map is less than a resolution of the second depth map and coordinates in the second depth map corresponding to a first pixel in the first depth map correspond to a plurality of second pixels in the second depth map, the depth processing unit rendering depth values to a plurality of third pixels corresponding to the plurality of second pixels in the optimized depth map according to a depth value of the first pixel and depth values of the plurality of second pixels.

5. The method of claim 1 further comprising:
the first depth capture device capturing at least one first image by at least one camera; and
the depth processing unit generating the first depth map according to the at least one first image.

6. The method of claim 5 wherein the depth processing unit generates the second depth map according to a binocular vision algorithm.

7. The method of claim 1, further comprising:
the second depth capture device capturing at least one second image by at least one camera; and
the depth processing unit generating the second depth map according to the at least one second image.

8. The method of claim 1 further comprising:
the first depth capture device generating the first depth map by a depth sensor;
the second depth capture device capturing at least one image by at least one camera; and
the depth processing unit generating the second depth map according to the at least one image.

9. The method of claim 8 wherein the first depth capture device generates the first depth map by time-of-flight or by analyzing structured light.

\* \* \* \* \*